US012214900B2

(12) United States Patent
Harms et al.

(10) Patent No.: US 12,214,900 B2
(45) Date of Patent: Feb. 4, 2025

(54) LATCH STATE DETECTION SYSTEMS, METHODS AND DEVICES

(71) Applicant: GOODRICH CORPORATION, Charlotte, NC (US)

(72) Inventors: Scott Harms, Ypsilanti, ND (US); Dustin P Scheer, Jamestown, ND (US); Aaron Roberts, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 835 days.

(21) Appl. No.: 17/443,582

(22) Filed: Jul. 27, 2021

(65) Prior Publication Data

US 2023/0036351 A1 Feb. 2, 2023

(51) Int. Cl.
*B64D 9/00* (2006.01)
*H04B 1/04* (2006.01)

(52) U.S. Cl.
CPC .............. *B64D 9/003* (2013.01); *H04B 1/04* (2013.01)

(58) Field of Classification Search
CPC ...................................................... B64D 9/003
USPC ............................................................ 410/77
See application file for complete search history.

(56) References Cited

U.S. PATENT DOCUMENTS 3,629,726 A * 12/1971 Popescu ................ B06B 1/0253
331/109
4,177,800 A * 12/1979 Enger ................... A61B 5/0002
600/302
4,886,413 A * 12/1989 Leon ......................... B66F 7/08
187/269
8,936,419 B1 * 1/2015 Islam ....................... B64C 1/20
410/80
9,656,750 B2 5/2017 Fischer et al.
10,005,564 B1 * 6/2018 Bhatia ....................... B64C 1/20
10,988,258 B2 4/2021 Weisfelner
2005/0253486 A1 * 11/2005 Schmidt .............. H10N 30/306
310/329
2007/0085680 A1 4/2007 Cohen
2013/0166063 A1 * 6/2013 Panzram ................ B65G 67/00
700/229
2019/0322369 A1 * 10/2019 Weisfelner ............. G08B 5/223

(Continued)

FOREIGN PATENT DOCUMENTS

DE         4136973 A1 *  5/1993  ............. B64D 9/003
DE    102004024591 A1 * 12/2005  ............ F24H 9/2028
DE    202013105253 U1 *  5/2014  ........... G01N 29/043

(Continued)

OTHER PUBLICATIONS https://www.tevema.com/can-springs-generate-electricity/ (Year: 2024).*

(Continued)

*Primary Examiner* — Hilary L Gutman
(74) *Attorney, Agent, or Firm* — SNELL & WILMER L.L.P.

(57) ABSTRACT

A latch assembly may comprise: a housing; a pawl assembly coupled to the housing, the pawl assembly configured to transition from an un-restrained state to an restrained state; and a latch state detection system comprising a transducer and a communications module, the transducer configured to convert mechanical energy from the pawl assembly reaching the restrained state to an electrical energy configured to power the communications module.

19 Claims, 11 Drawing Sheets

(56) References Cited

U.S. PATENT DOCUMENTS

2021/0031921 A1\* 2/2021 Junior .................... B64D 9/00
2021/0261041 A1\* 8/2021 Shivalinga ............ B60P 7/0815

FOREIGN PATENT DOCUMENTS

EP 2899124 7/2015
EP 3556656 10/2019

OTHER PUBLICATIONS https://www.sciencedirect.com/science/article/pii/B9780750650793500073 (Year: 2001).\*
https://scientiairanica.sharif.edu/article_21804.html (Year: 2021).\*
https://www.ncbi.nlm.nih.gov/pmc/articles/PMC6266796/ (Year: 2018).\*
European Patent Office, European Search Report dated Feb. 23, 2023 in Application No. 22185709.7.

\* cited by examiner

LATCH STATE DETECTION SYSTEMS, METHODS AND DEVICES

FIELD

The present disclosure relates generally to cargo handling systems and, more particularly, to actuator assemblies and latch assemblies for cargo handling systems.

BACKGROUND

Cargo handling systems for aircraft typically include various tracks and rollers disposed on a cargo deck that spans the length of a cargo compartment. Cargo may be loaded from an entrance of the aircraft and transported by the cargo system to forward or aft locations, depending upon the configuration of the aircraft. Cargo handling systems, such as, for example, those used on aircraft for transport of heavy containerized cargo or pallets, also referred to herein as unit load devices (ULDs), typically include restraints to lock the ULDs in the cargo compartment. Typical latches for ULDs are operated manually, which lend themselves to potential user error.

SUMMARY

A latch assembly is disclosed herein. The latch assembly may comprise: a housing; a pawl assembly coupled to the housing, the pawl assembly configured to transition from an un-restrained state to an restrained state; and a latch state detection system comprising a transducer and a communications module, the transducer configured to convert mechanical energy from the pawl assembly reaching the restrained state to an electrical energy configured to power the communications module.

In various embodiments, the pawl assembly comprises an inner pawl and an outer pawl. The inner pawl may be configured to activate the transducer in response to the pawl assembly reaching the restrained state. The transducer may comprise a piezoelectric button. The transducer may comprise an electric generator configured to convert one of linear or rotary motion into the electrical energy. The communications module may include a transmitter, the transmitter configured to transmit a wireless signal including a unique identifier of the latch assembly.

A cargo handling system is disclosed herein. The cargo handling system may comprise: a control unit comprising one of a first transceiver or a receiver; a latch state detection system comprising: a transducer configured to convert mechanical energy to electrical energy; and a communications module in electrical communication with the transducer, the communications module including one of a transmitter or a second transceiver, the transmitter or the second transceiver configured to be powered by the transducer in response to a latch assembly reaching a fully restrained state, the transmitter or the second transceiver configured to send a wireless signal to the first transceiver or the receiver in response to being powered by the transducer.

In various embodiments, the cargo handling system may further comprise a pawl assembly comprising an inner pawl and an outer pawl, the inner pawl comprising a notch configured to activate the transducer in response to the pawl assembly reaching the fully restrained state. The transducer may comprise a piezoelectric button configured to compress in response to the pawl assembly reaching the fully restrained state. The transducer may comprise an electric generator and a spring, the spring configured to store energy during a transition of the latch assembly from an un-restrained state to the fully restrained state and release in response to the latch assembly reaching the fully restrained state. The mechanical energy generated from the spring being released may be converted to the electrical energy to power the transmitter or the second transceiver. The cargo handling system may further comprise the latch assembly, the latch assembly including the latch state detection system. The cargo handling system may further comprise a tray extending longitudinally through a cargo deck, the latch assembly coupled to the tray. The cargo handling system may further comprise a plurality of the latch assembly.

A cargo handling system is disclosed herein. The cargo handling system may further comprise: a control system comprising a main controller and a receiver; a plurality of latch assemblies configured to be disposed throughout a cargo deck, each latch assembly in the plurality of latch assemblies comprising a latch state detection system, the latch state detection system including a transmitter, the transmitter configured to transmit a unique identifier to the receiver of the control system in response to a respective latch reaching a fully restrained state.

In various embodiments, the main controller is configured to send an indication that the respective latch assembly is in the fully restrained state in response to receiving the unique identifier from the receiver. Each latch assembly in the plurality of latch assemblies may comprise a transducer configured to convert mechanical energy to electrical energy. The transducer may be configured to power the transmitter. The transducer may comprise a piezoelectric button. The transducer may comprise an electric generator configured to convert linear or rotational motion to the electrical energy.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein are latch detection systems, methods, and devices. A latch detection system is configured to verify a latch state for a latch assembly in a cargo handling system. In various embodiments, the latch detection system facilitates verification that a latch is deployed in a wireless manner without manual inspection, which may greatly simplify a loading or unloading process of a cargo compartment as described further herein. In various embodiments, each latch assembly in a cargo handling system may comprise at least a portion of the latch detection system. For example, the deployment motion of the latch assembly may be configured to release a charge into a storage device upon completion of deployment. In response to the storage device receiving the charge, a transmitter or transceiver may transmit the signal to a receiver or transceiver of a control unit to provide a status of the latch assembly. Thus, the systems, methods and devices disclosed herein may facilitate wireless, automated latch status detection, in accordance with various embodiments.

Figure 1A:
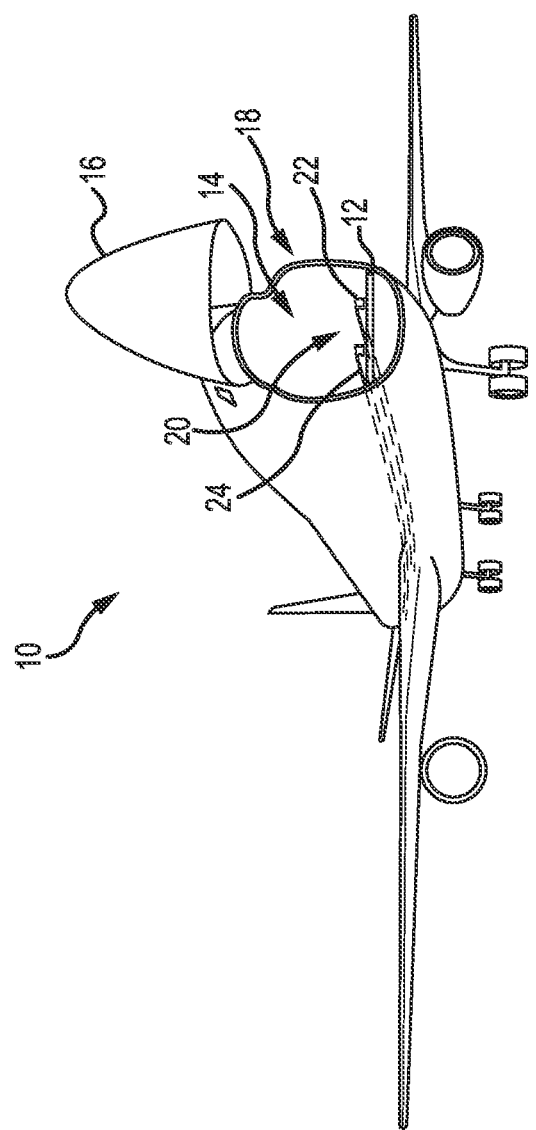
FIGS. 1A and 1B illustrate schematic views of a cargo handling system, in accordance with various embodiments.
Figure 1B:
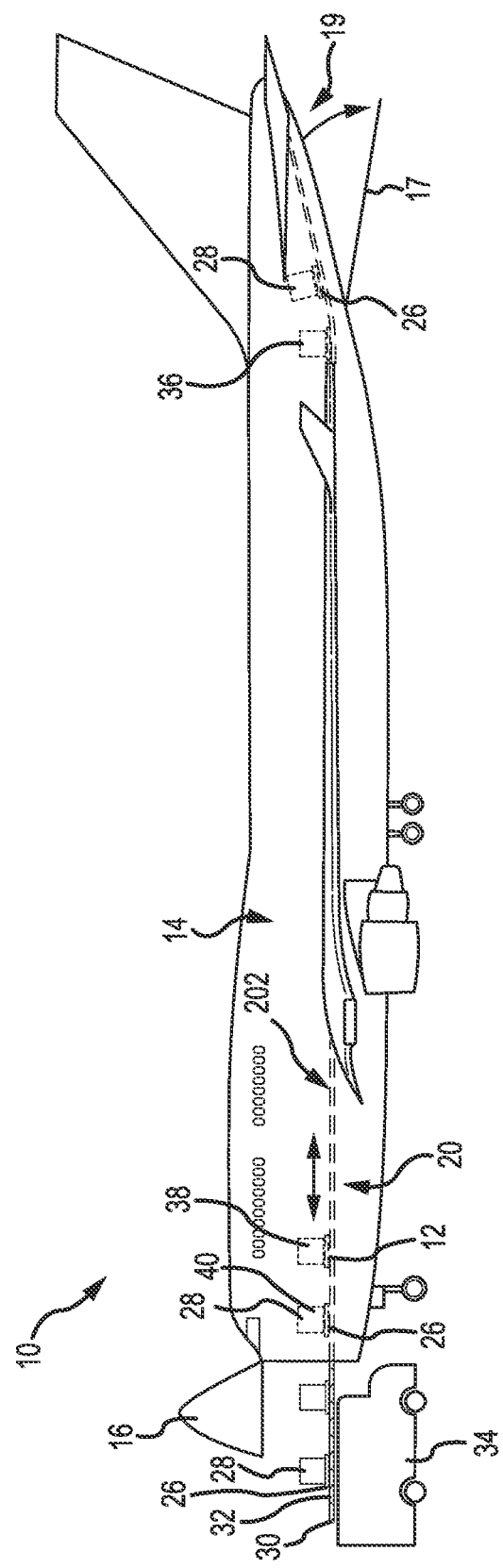

With reference to FIGS. 1A and 1B, a schematic view of an aircraft 10 having a cargo deck 12 located within a cargo compartment 14 is illustrated, in accordance with various embodiments. The aircraft 10 may comprise a cargo load door 16 located, for example, at a forward end of the aircraft 10 and configured to rotate upward (as illustrated in FIG. 1A) or sideways to expose an opening 18 that provides access to the cargo compartment 14. In various embodiments, a second cargo load door 17 may be located at other portions of the aircraft 10, such as, for example, at an aft end of the aircraft 10 and configured to rotate downward (as illustrated in FIG. 1B) and provide a second opening 19 to gain access to the cargo compartment 14. Inside the cargo compartment 14, one or more trays 20, e.g., a first tray or track 22 and a second tray or track 24, extend generally from the fore end of the aircraft 10 to the aft end of the aircraft 10. As described more fully below, the one or more trays 20 provide a support structure for which a platform 26 may transit along a length of the aircraft 10 between the fore end and the aft end and carry a ULD or some other form of cargo carrier, such as, for example, a container of a size typically used for ocean-going transport by ship or truck. Without loss of generality, a cargo load 28 of any size or shape, which may include objects within containers or ULDs or objects not within containers or ULDs, such as, for example, automobiles or the like, will be considered herein as configured for transport on the platform 26.

Still referring to FIGS. 1A and 1B, in various embodiments, the one or more trays 20, during loading or unloading of the cargo load 28, may be connected to a loading structure 30 which, in various embodiments, may comprise one or more trays or tracks 32 that correspond to the one or more trays 20 extending along the cargo deck 12 of the aircraft 10. In various embodiments, the loading structure 30 may be attached to an elevated structure, such as, for example, a truck 34 (as illustrated in FIG. 1B) or a scissor lift or a loading dock or the like, such that the one or more trays 20 and the loading structure 30 are located substantially at the same elevation and configured to transition a platform 26 either onto or off from the one or more trays 20. For example, a first cargo load 36 may be transitioned from the loading structure 30, through the opening 18 and onto the one or more trays 20, and then along the one or more trays 20 to the aft end of the aircraft, where the first cargo load 36 is secured for transport. This may be followed by a second cargo load 38, a third cargo load 40 and so on until the cargo deck 12 is filled to a desired capacity with cargo. After the aircraft 10 has reached its destination, each cargo load, such as, for example, the first cargo load 36, the second cargo load 38 and the third cargo load 40 are unloaded from the aircraft 10 in similar fashion, but in a reverse sequence to the loading procedure. To ensure cargo loads are restrained, the aircraft 10 may include a restraint assembly as described herein and in accordance with various embodiments.

Figure 2:
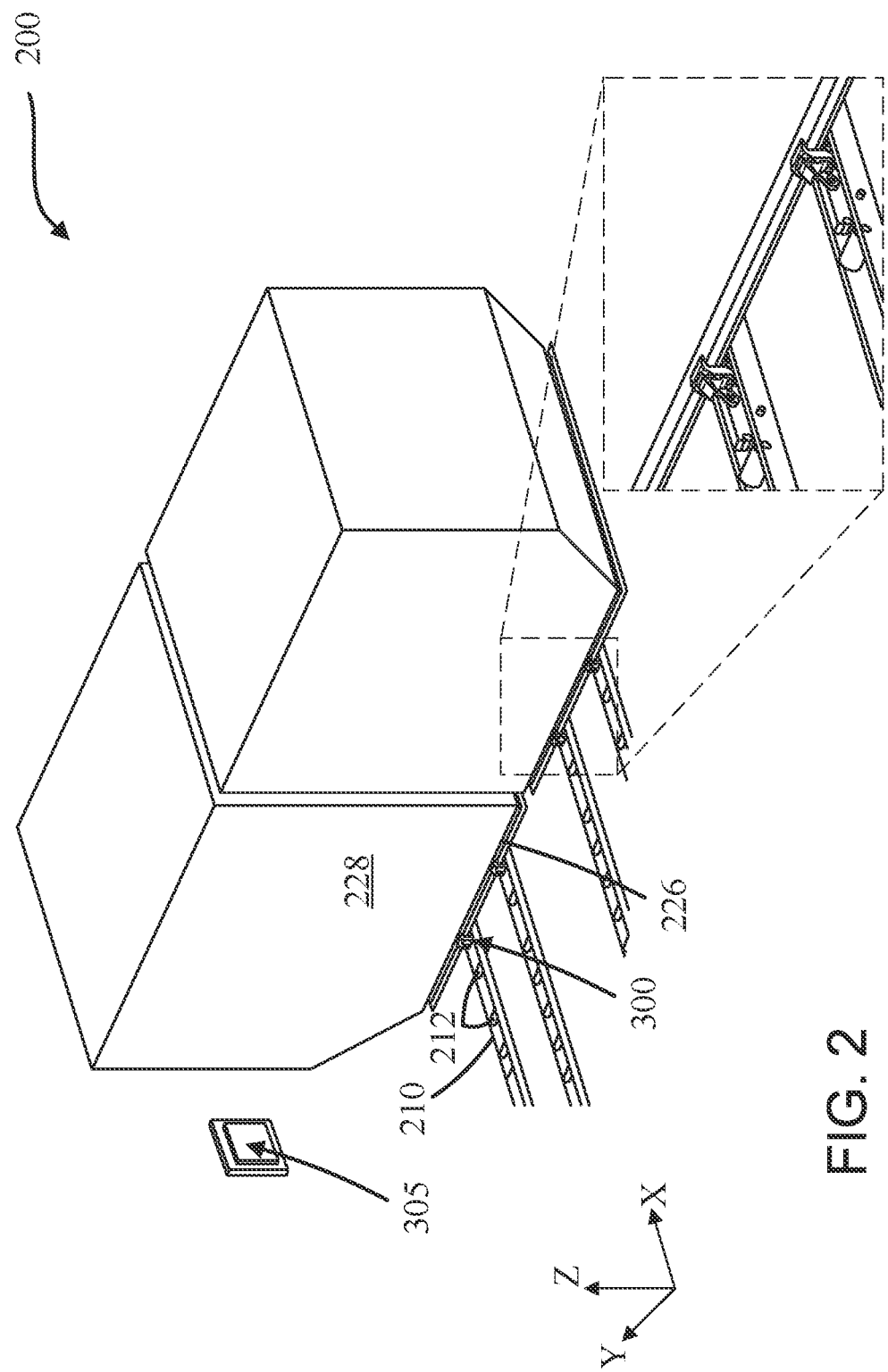
FIG. 2 illustrates a portion of a cargo handling system, in accordance with various embodiments.

Referring now to FIG. 2, a portion of a cargo handling system 200 is illustrated, in accordance with various embodiments. The cargo handling system 200 is illustrated with reference to an XYZ coordinate system, with the X-direction extending longitudinally in an aft direction (and defining a longitudinal direction), the Y-direction extending perpendicular to the X-direction (and defining a lateral direction) and the Z-direction extending vertically, each direction being with respect to an aircraft in which the cargo handling system 200 is positioned, such as, for example, the aircraft 10 described above with reference to FIGS. 1A and 1B.

In various embodiments, the cargo handling system 200 may define at least one tray or track 210 extending longitudinally in the aft direction (i.e., the X-direction). The tray 210 may include a plurality of rollers 212, each roller extending laterally from a first lateral side of the tray 210 to a second lateral side of the tray 210. In various embodiments, the cargo handling system 200 includes a platform 226 (or a plurality of platforms), such as, for example, the platform 26 described above with reference to FIGS. 1A and 1B. The platform 226 is configured to support a cargo load 228, which may include containerized or non-containerized cargo. As illustrated in FIG. 1B, in various embodiments, the tray 210 may include a substantially level surface throughout the length of the aircraft, though a portion of the tray 210 may be curved upward, particularly toward the aft end of the aircraft where the fuselage tends to curve upward at its base in order to facilitate takeoff and landing. The cargo handling system 200 may further comprise a latch assembly 300 and a cargo control unit 305. The cargo control unit 305 may be in electrical communication with the latch assembly 300. The latch assembly 300 may be configured to lock the platform 226 in place. For example, the control unit 305 may be configured to transition the latch assembly 300 from a locked position to an unlocked position, or vice versa.

Figure 3A:
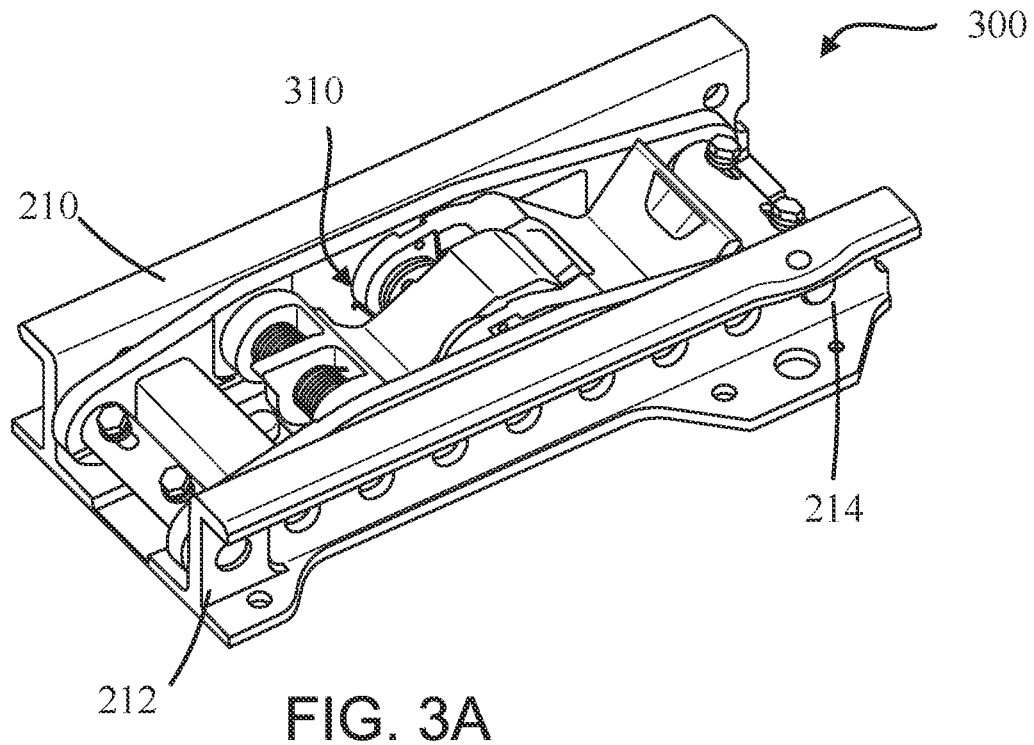
FIG. 3A illustrates a perspective view of a latch assembly installed in a tray in an un-restrained state, in accordance with various embodiments.
Figure 3B:
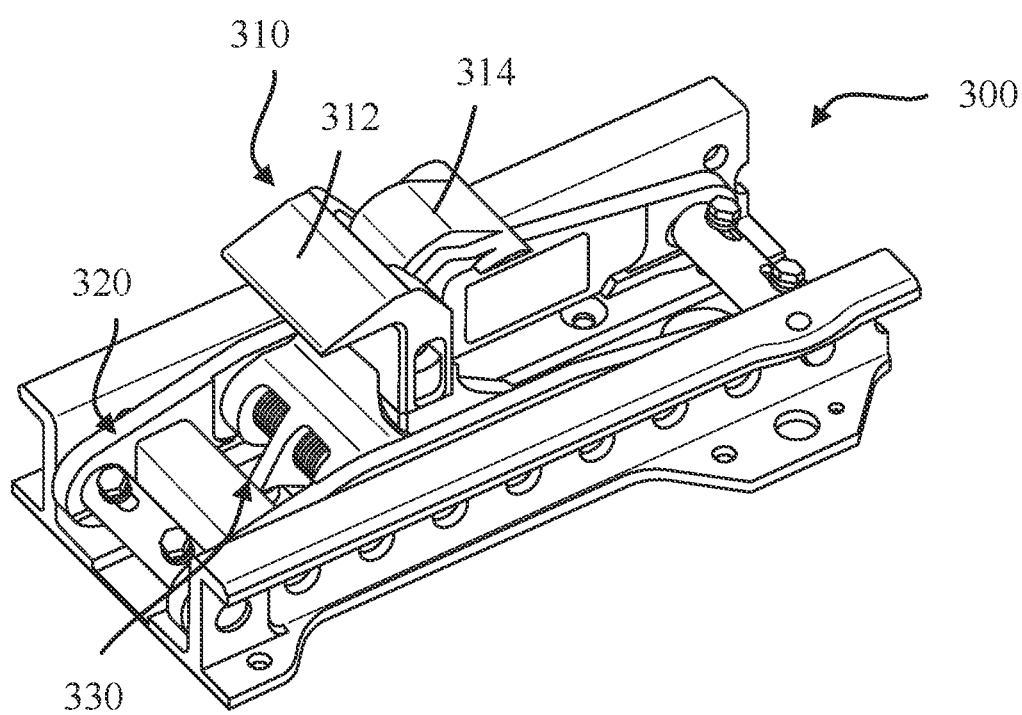
FIG. 3B illustrates a perspective view of a latch assembly installed in a tray in a fully restrained state, in accordance with various embodiments.

Referring now to FIGS. 3A and 3B, a perspective view of a latch assembly 300 installed within a tray 210 in a retracted or unlatched state (FIG. 3A) and a restrained or latching state (FIG. 3B), in accordance with various embodiments. The latch assembly 300 comprises a pawl assembly 310 operably coupled to a latch housing 320. The latch housing 320 of the latch assembly 300 may be coupled to the tray 210 at a first longitudinal end 212 of the tray 210 and a second longitudinal end 214 of the tray 210. As illustrated, the pawl assembly 310 is configured to transition from the unrestrained state (FIG. 3A) to the restrained state (FIG. 3B) during a loading process and vice versa during an unloading process. The restrained state (FIG. 3B) is utilized during transport of cargo (e.g., a cargo load 28 from FIGS. 1A and 1B) to restrain a platform (e.g., platform 226 from FIG. 2) or the like. In this regard, ensuring that each latch assembly 300 of a cargo handling system 200 from FIG. 2 is fully deployed in a restrained state and securing a respective platform is done during or after loading a cargo deck. Typical latch status detection systems are manual inspections, which may be time consuming and may be subject to inspector error. Thus, the latch assembly 300 further comprises a latch state detection system 330. The latch state detection system 330 is configured to automatically detect when a latch assembly 300 is in a restrained state (FIG. 3B). The latch state detection system 330 of the latch assembly 300 is further configured to transmit, in response to being activated, a signal to indicate the latch assembly 300 is in a fully restrained state (FIG. 3B).

In various embodiments, the pawl assembly 310 comprises an outer pawl or latch 312 and an inner pawl or latch 314. The inner pawl 314 is configured to restrain a first platform (e.g., platform 226) and the outer pawl 312 is configured to restrain a second platform (e.g., an adjacent platform in accordance with platform 226) during transport of cargo (e.g., cargo load 28 from FIGS. 1A and 1B). During loading, the pawl assembly 310 transitions from the unrestrained state to the restrained state once a first platform is in place. In this regard, during loading one of the outer pawl 312 or the inner pawl 314 will engage the first platform and the remaining pawl will remain unengaged until a second platform is loaded and abuts the remaining pawl in accordance with various embodiments. Thus, during loading, the latch state is often detected one row at a time, in accordance with various embodiments.

Figure 4A:
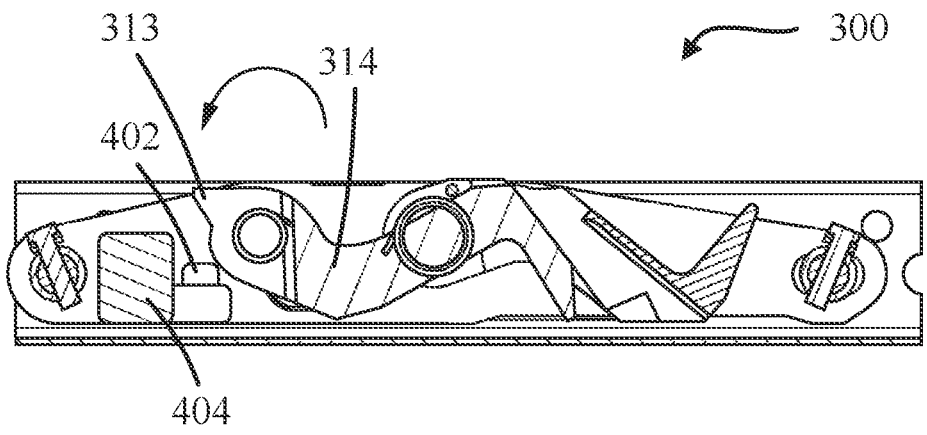
FIG. 4A illustrates a cross-sectional view of a latch assembly installed in a tray in an un-restrained state, in accordance with various embodiments.
Figure 4B:
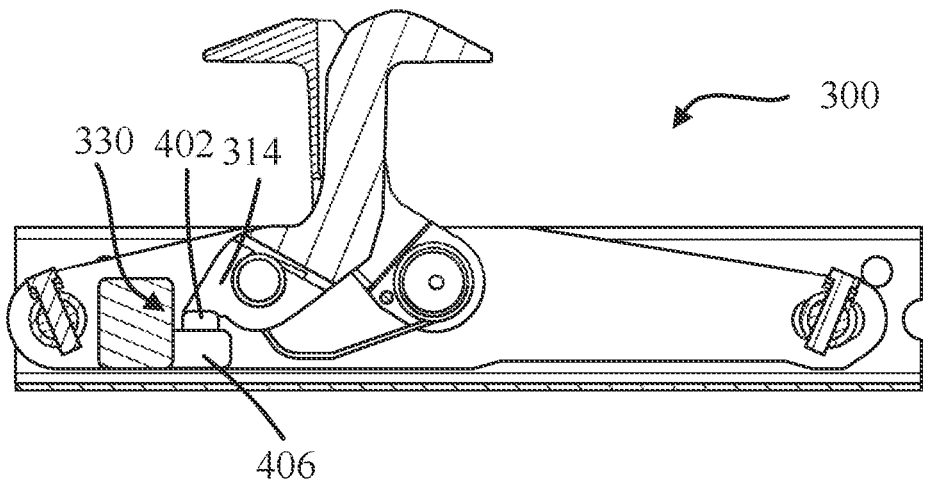
FIG. 4B illustrates a cross-sectional view of a latch assembly installed in a tray in a fully restrained state, in accordance with various embodiments.

Referring now to FIGS. 4A and 4B, a cross-sectional view of a latch assembly 300 with the latch state detection system 330 is illustrated transitioning from an un-restrained state (FIG. 4A) to a restrained state (FIG. 4B), in accordance with various embodiments. The latch state detection system 330 is configured to generate an electrical signal in response to mechanical motion as described further herein. The latch state detection system 330 is further configured to transmit a latch identifier (i.e., a unique identifier in accordance with the Institute of Electrical and Electronics Engineers (IEEE) 802.15.1 or 802.15.4, or the like) to a control unit of a cargo handling system (e.g., control unit 305 from FIG. 2). The latch identifier transmitted to the control unit provides an indication to the control unit that the latch assembly 300 that is associated with the respective unique identifier is in a fully restrained state (i.e., an acceptable state for transport).

In various embodiments, the latch state detection system 330 comprises a transducer 402 and a communications module 404. The transducer 402 is configured to convert mechanical energy to electrical energy. In various embodiments, the transducer 402 is a piezoelectric button 406. In this regard, in response to being compressed (e.g., by a notch 313 of inner pawl 314), the transducer 402 generates an electrical charge. In various embodiments, use of the inner pawl 314 as an activating device of the latch state detection system 330 may provide a better indication of the pawl assembly 310 being in a fully restrained state (FIG. 4B), as the outer pawl 312 may be in a fully restrained state without the inner pawl 314 being in a fully restrained state. In this regard, movement of the outer pawl 312 may drive movement of the inner pawl 314, in accordance with various embodiments. Thus, a "fully restrained state" of the pawl assembly 310, as described herein, refers to both the outer pawl 312 and the inner pawl 314 being fully deployed and in a position to engage/restrain a platform 226 or the like. The "fully restrained state" is illustrated in FIG. 4B.

In various embodiments, the communications module 404 is configured to receive the electrical charge generated from the transducer 402 (e.g., via a conductive wire or the like). In response to receiving the electrical charge, the communications module 404 may be powered and configured to transmit a signal to a control unit (e.g., control unit 305) of a cargo handling system (e.g., cargo handling system 200 of FIG. 2) as described previously herein.

Figure 5A:
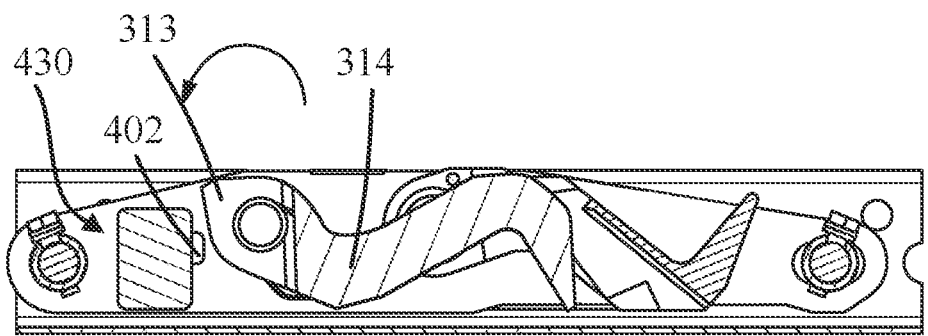
FIG. 5A illustrates a cross-sectional view of a latch assembly installed in a tray in an un-restrained state, in accordance with various embodiments.
Figure 5B:
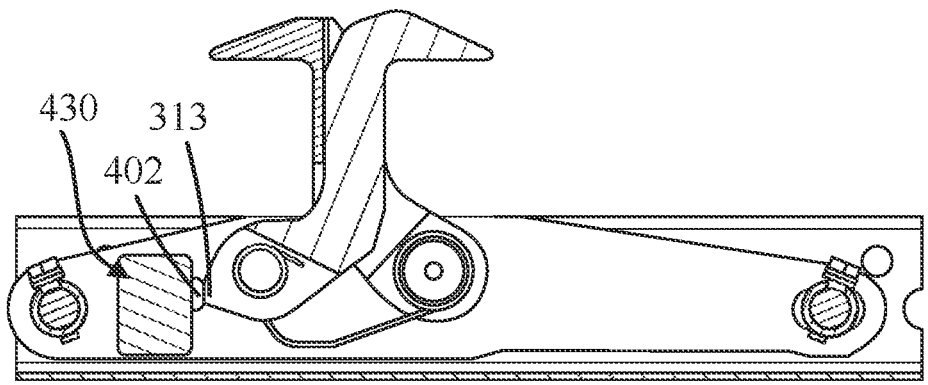
FIG. 5B illustrates a cross-sectional view of a latch assembly installed in a tray in a fully restrained state, in accordance with various embodiments.

In various embodiments, the transducer 402 may be oriented in a vertical direction (i.e., the Z-direction). However, the present disclosure is not limited in this regard. For example, as illustrated in FIGS. 5A and 5B, the transducer 402 of the latch state detection system 330 may be oriented in a horizontal direction (e.g., the Y-direction) and still be within the scope of this disclosure. In various embodiments, by orienting the transducer 402 horizontally as shown in FIGS. 5A and 5B, the latch state detection system 430 of FIGS. 5A and 5B may provide an additional advantage from the latch state detection system 330 in that the notch 313 of the inner pawl 314 cannot be pushed back on from the transducer 402 to transition the pawl assembly 310 to a state that is less than fully deployed in the horizontal configuration (FIGS. 5A and 5B) relative to the vertical configuration (FIGS. 4A and 4B).

Figure 6:
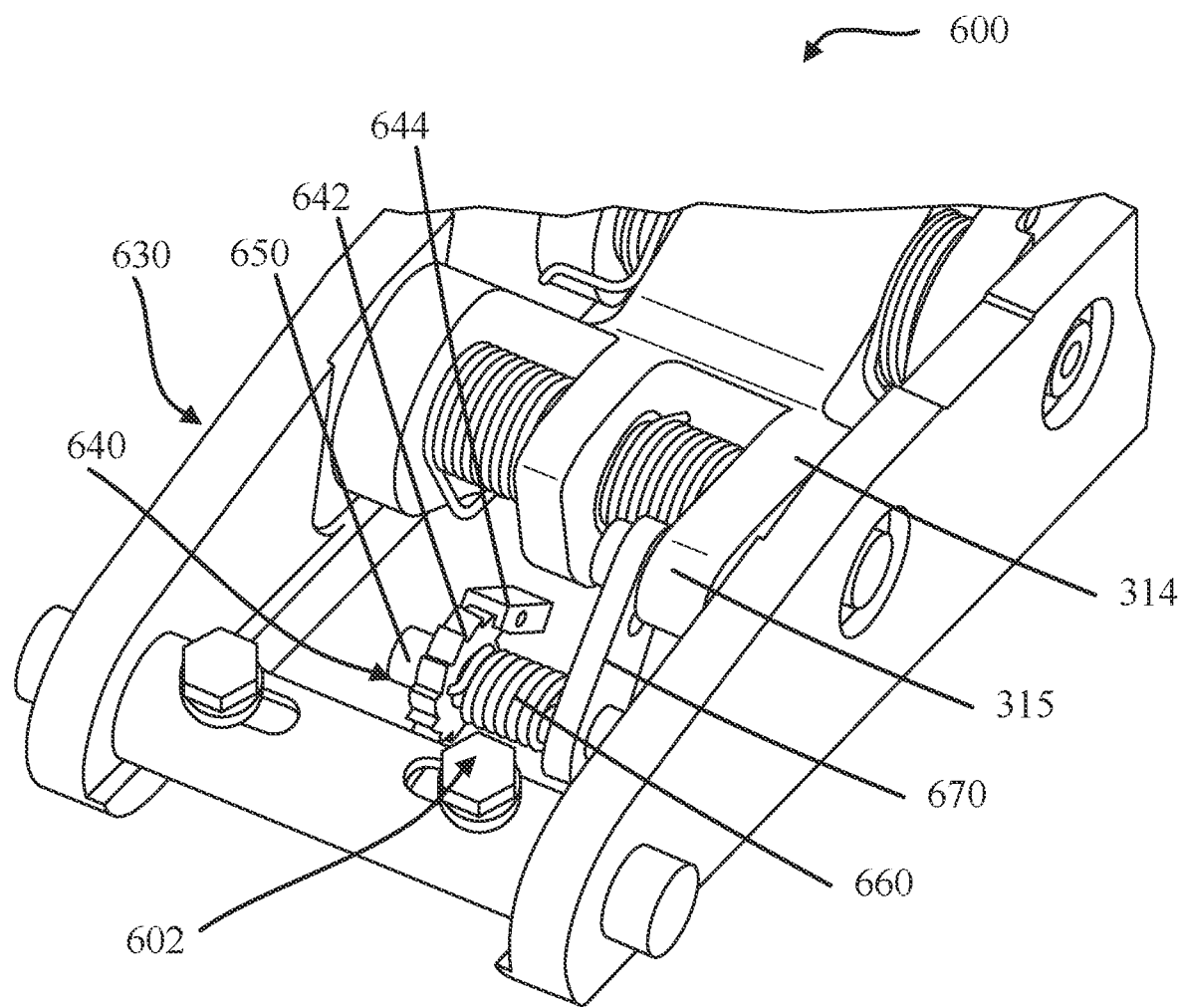
FIG. 6 illustrates a perspective view of a portion of a latch assembly in an un-restrained state, in accordance with various embodiments.

Referring now to FIG. 6, a perspective view of a latch assembly 600 having a latch state detection system 630 is illustrated, in accordance with various embodiments. The latch assembly 600 comprises a transducer 602. The transducer 602 is configured to convert mechanical energy to electrical energy in a similar manner to transducer 402. However, the transducer 602 is configured to convert rotary motion to electrical energy as described further herein.

In various embodiments, the latch state detection system 630 further comprises a ratchet 640 including a gear 642 and a pawl 644, a shaft 650, a torsion spring 660, and a link 670. The gear 642 is coupled to the shaft 650 of the latch state detection system 630 and configured to rotate with the shaft 650. Similarly, the link 670 is coupled to the shaft 650 and configured to rotate with the shaft 650 about a shaft axis in response to transitioning from an un-restrained state to a restrained state or vice versa as described further herein. In this regard, the link 670 is coupled to the shaft 650 at a proximal end of the link 670 and the link is coupled to a flange 315 of the inner pawl 314 at a distal end of the link 670.

Figure 7A:
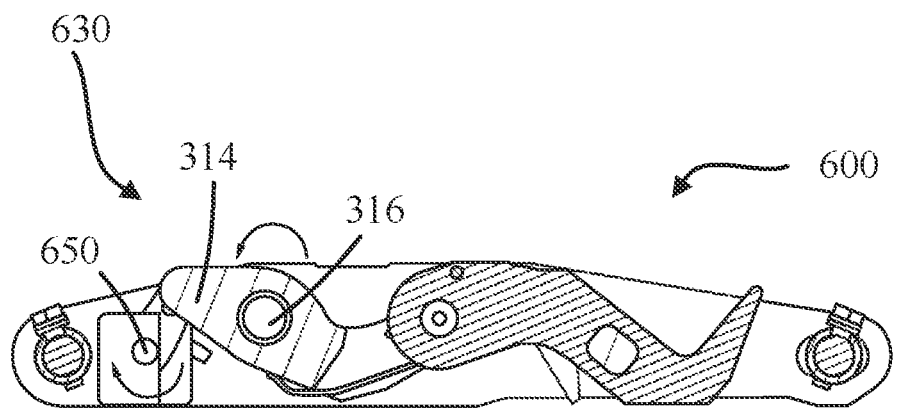
FIG. 7A illustrates a cross-sectional view of a latch assembly installed in a tray in an un-restrained state, in accordance with various embodiments.
Figure 7B:
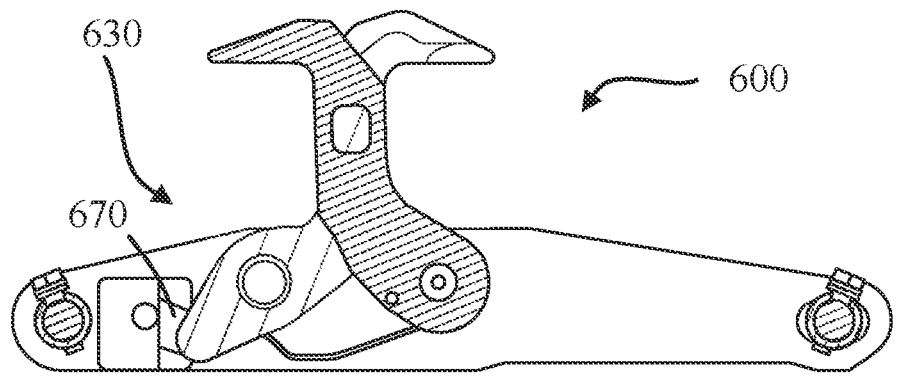
FIG. 7B illustrates a cross-sectional view of a latch assembly installed in a tray in a fully restrained state, in accordance with various embodiments.

Referring now to FIGS. 7A, 7B, 8A, and 8B cross-sectional views of a latch assembly 600 with a latch state detection system 630 with a pawl assembly 310 in an un-restrained state (FIG. 7A, FIG. 8A) and a fully restrained state (FIG. 7B, FIG. 8B) are illustrated, in accordance with various embodiments. The inner pawl 314 is coupled to an inner pawl shaft 316 and configured to rotate with the inner pawl shaft 316 about an axis defined by the inner pawl shaft 316. In response to the inner pawl 314 rotating in a first direction (e.g., counterclockwise) about the inner pawl axis, the link 670 causes the shaft 650 to rotate in an opposite direction (e.g., clockwise) about the link axis as shown in FIGS. 7A and 7B.

Figure 8A:
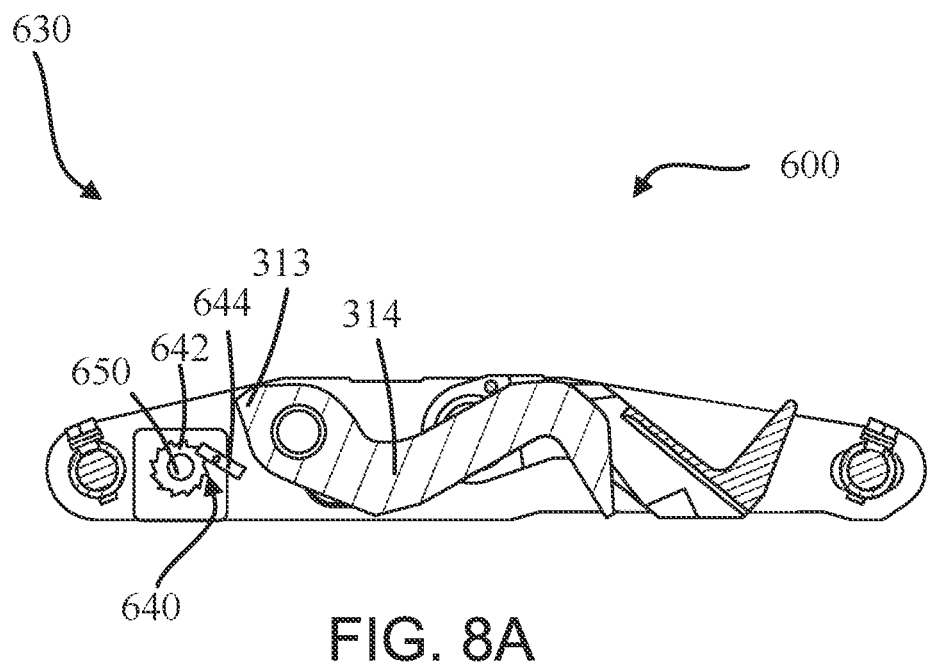
FIG. 8A illustrates a cross-sectional view of a latch assembly installed in a tray in an un-restrained state, in accordance with various embodiments.
Figure 8B:
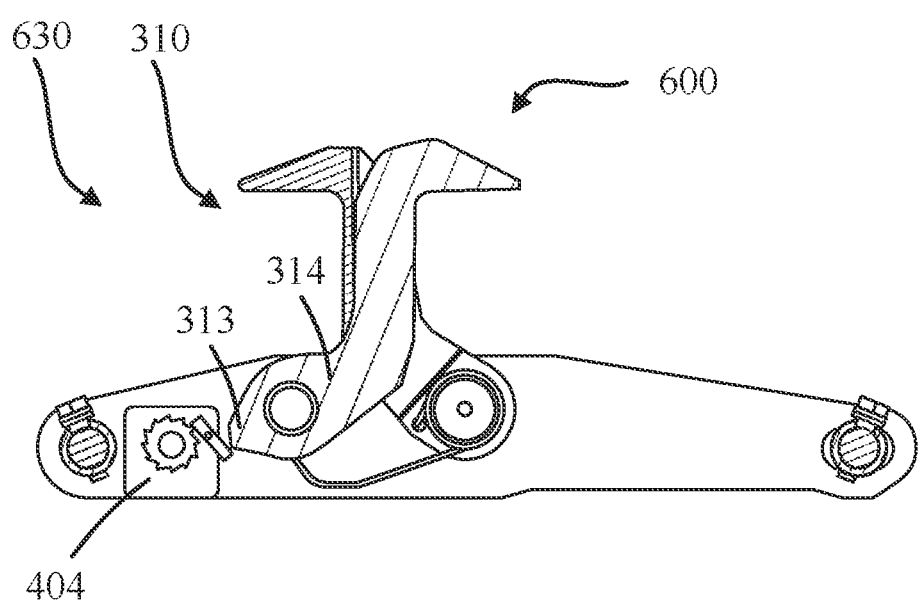
FIG. 8B illustrates a cross-sectional view of a latch assembly installed in a tray in a fully restrained state, in accordance with various embodiments.

In response to the shaft 650 rotating, the torsion spring 660 from FIG. 6 is loaded until a notch 313 of the inner pawl 314 contacts and rotates that pawl 644 of the ratchet 640, which releases gear 642 from the pawl 644 (as shown in FIG. 8B). In response to being released, the shaft 650 rotates back due to the torsion spring 660 being loaded. In various embodiments, the transducer 602 from FIG. 6 is an electric generator configured to convert the rotary motion of the shaft 650 upon release of the gear 642 from the pawl 644 to electrical energy to power a communications module 404 of the latch state detection system 630. In various embodiments, the latch state detection system 630 is configured such that the pawl 644 is not released until the pawl assembly 310 is in a fully deployed position (FIG. 8B). In various embodiments, the latch state detection system 630 may provide a design that can customize torque/speed of rotation for the pawl assembly 310 to optimize for energy conversion through a geartrain.

Figure 9:
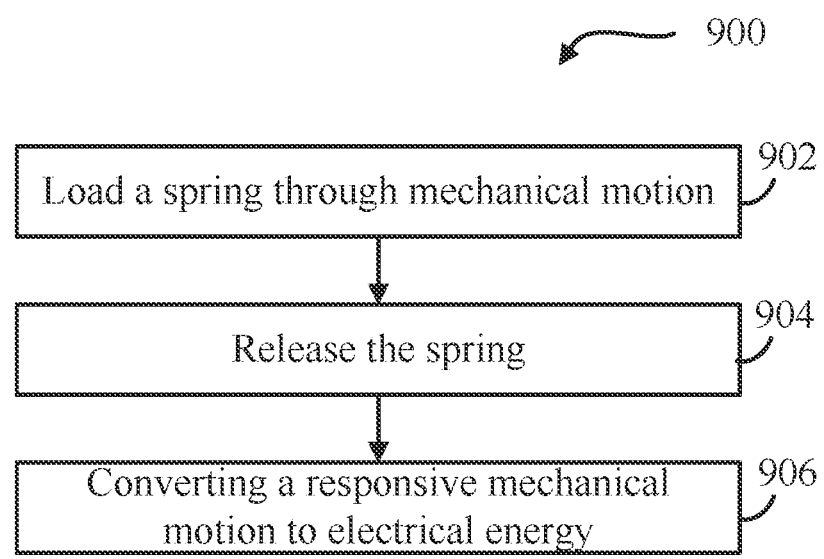
FIG. 9 illustrates a method of operation for a state latch detection system, in accordance with various embodiments.

Although latch state detection system 630 is illustrated as loading a torsion spring via rotary motion and converting the rotary motion to electrical energy upon release, the latch state detection system 630 is not limited in this regard. For example, one skilled in the art may recognize that a similar concept to the latch state detection system 630 could be utilized replacing the torsion spring 660 with a tension or compression spring, loading the tension or compression spring by actuation of a bar which compress or extends the spring, and releasing the tension or compression spring via the notch 313 in accordance with various embodiments. In this regard, the same concept as the latch state detection system 630 applies and is illustrated in FIG. 9. The latch state detection system would be configured to load a spring (e.g., torsional, compression, or tension) through mechanical motion (step 902), release the spring in response to a pawl assembly reaching a fully restrained state (e.g., via a notch of an inner pawl) (step 904), and converting a responsive mechanical motion created by the spring (e.g., a responsive rotation or a responsive translation) to electrical energy (e.g., via a transducer) (step 906).

Figure 10:
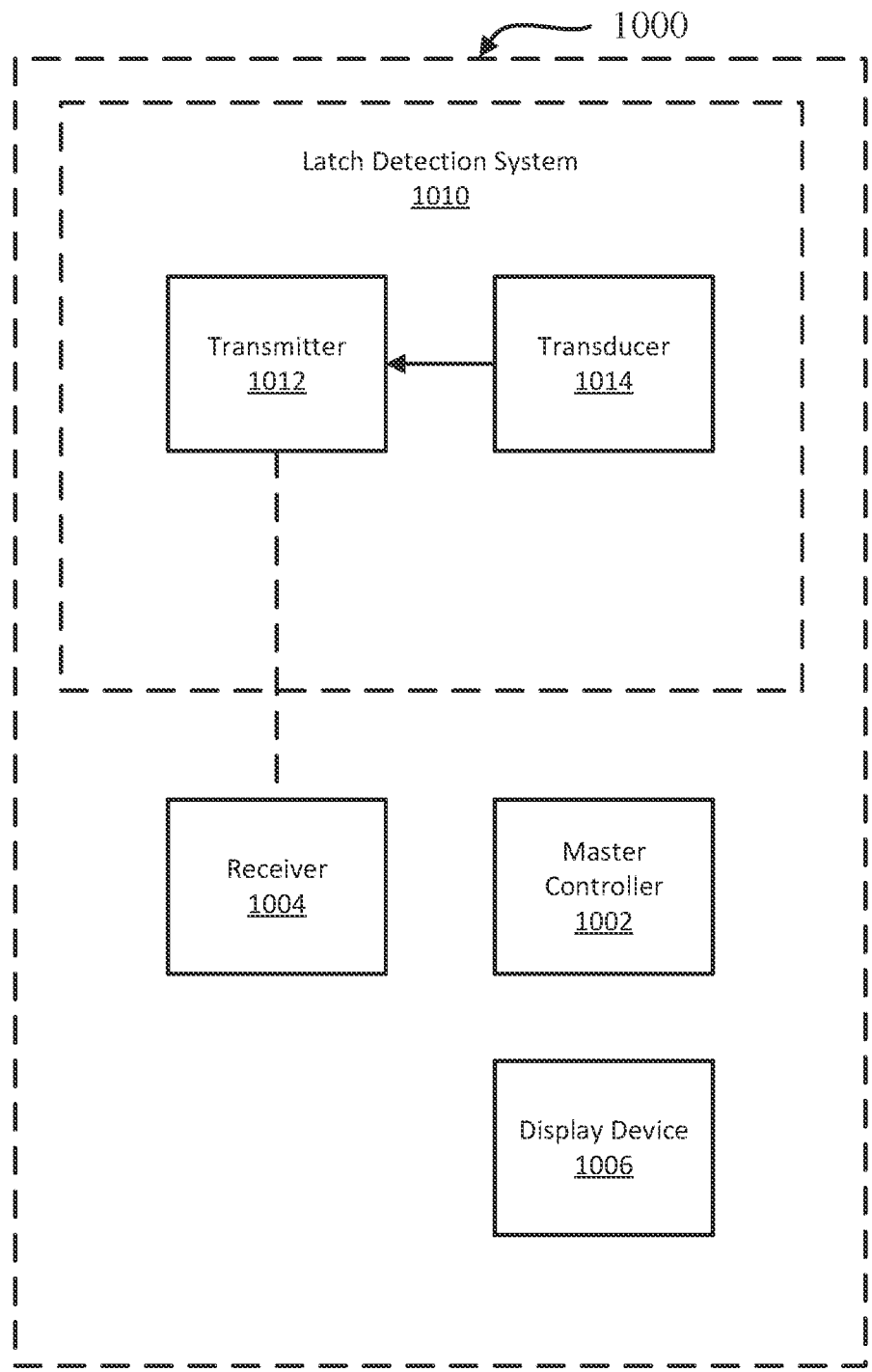
FIG. 10 illustrates schematic view of a control system with a state latch detection system, in accordance with various embodiments.

Referring now to FIG. 10, a schematic view of control system 1000 having a latch state detection system 1010 is illustrated in accordance with various embodiments. All of the latch state detection systems disclosed herein are in accordance with latch state detection system 1010. In this regard, as previously described herein, each latch state detection system (e.g., latch state detection systems 330, 430, 630) include a transducer 1014 (e.g., transducer 402, 602) and a transmitter 1012 (e.g., a transmitter disposed in communications module 404).

In various embodiments, the control system 1000 comprises a master controller 1002 in operable communication (e.g., wireless) with the latch state detection system 1010 of a latch assembly (e.g., latch assembly 300, 600, or the like). In various embodiments, controller 1002 may be integrated into a computer system, such as cargo control unit 305 from FIG. 2. In various embodiments, controller 1002 may be configured as a central network element or hub to access various systems and components of control system 1000. Controller 1002 may comprise a network, computer-based system, and/or software components configured to provide an access point to various systems and components of control system 1000. In various embodiments, controller 1002 may comprise a processor. In various embodiments, controller 1002 may be implemented in a single processor. In various embodiments, controller 1002 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 1002 may comprise a processor configured to implement various logical operations in response to execution of instructions, for example, instructions stored on a non-transitory, tangible, computer-readable medium configured to communicate with controller 1002.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, controller 1002 may be in wireless communication with the latch state detection system 1010. For example, controller 1002 may be in electronic communication with a receiver 1004 of the control system 1000. Although illustrated as comprising a receiver 1004, the present disclosure is not limited in this regard. For example, the receiver 1004 may be a transceiver in accordance with various embodiments. In various embodiments, the controller 1002 may also be in electronic communication with a display device 1006. In this regard, in response to receiving an indication from the latch detection system that a respective latch assembly is in a fully restrained state, the display device 1006 may be commanded to, via the controller, indicate the respective latch assembly is in an acceptable state for transport, in accordance with various embodiments.

In various embodiments, the transducer 1014 is configured to convert a mechanical motion that occurs during a process of transitioning a pawl assembly in a latch assembly from an un-restrained state to a fully restrained state to electrical energy to power the transmitter 1012. In various embodiments, the mechanical motion that triggers the transducer is configured to coincide with the pawl assembly reaching the fully restrained state as described previously herein. In this regard, if the pawl assembly does not reach a fully restrained state, the mechanical motion in its entirety will not occur; thus, not enough electrical energy will provide power to the transmitter 1012 to transmit the signal described previously herein. Although illustrated as comprising a transmitter 1012, the latch state detection system 1010 is not limited in this regard. For example, the transmitter 1012 may be a transceiver, in accordance with various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A latch assembly, comprising:
   a housing;
   a pawl assembly coupled to the housing, the pawl assembly configured to transition from an un-restrained state to a restrained state; and
   a latch state detection system comprising a transducer and a communications module, the transducer configured to convert mechanical energy from the pawl assembly reaching the restrained state to an electrical energy configured to power the communications module, wherein in response to receiving the electrical energy, the communications module is powered and configured to transmit a signal to a control unit of a cargo handling system.

2. The latch assembly of claim 1, wherein the pawl assembly comprises an inner pawl and an outer pawl.

3. The latch assembly of claim 2, wherein the inner pawl is configured to activate the transducer in response to the pawl assembly reaching the restrained state.

4. The latch assembly of claim 1, wherein the transducer comprises a piezoelectric button.

5. The latch assembly of claim 1, wherein the transducer comprises an electric generator configured to convert one of linear or rotary motion into the electrical energy.

6. The latch assembly of claim 1, wherein the communications module includes a transmitter, the transmitter configured to transmit a wireless signal including a unique identifier of the latch assembly.

7. A cargo handling system, comprising:
   a control unit comprising one of a first transceiver or a receiver;
   a latch state detection system comprising:
      a transducer configured to convert mechanical energy to electrical energy; and
      a communications module in electrical communication with the transducer, the communications module including one of a transmitter or a second transceiver, the transmitter or the second transceiver configured to be powered by the transducer in response to a latch assembly reaching a fully restrained state, the transmitter or the second transceiver configured to send a wireless signal to the first transceiver or the receiver in response to being powered by the transducer wherein in response to receiving the electrical energy, the communications module is powered and configured to transmit the wireless signal to the first transceiver or the receiver.

8. The cargo handling system of claim 7, further comprising a pawl assembly comprising an inner pawl and an outer pawl, the inner pawl comprising a notch configured to activate the transducer in response to the pawl assembly reaching the fully restrained state.

9. The cargo handling system of claim 8, wherein the transducer comprises a piezoelectric button configured to compress in response to the pawl assembly reaching the fully restrained state.

10. The cargo handling system of claim 7, wherein the transducer comprises an electric generator and a spring, the spring configured to store mechanical energy during a transition of the latch assembly from an un-restrained state to the fully restrained state and release in response to the latch assembly reaching the fully restrained state.

11. The cargo handling system of claim 10, wherein the mechanical energy generated from the spring being released is converted to the electrical energy to power the transmitter or the second transceiver.

12. The cargo handling system of claim 7, further comprising the latch assembly, the latch assembly including the latch state detection system.

13. The cargo handling system of claim 7, further comprising a tray extending longitudinally through a cargo deck, the latch assembly coupled to the tray.

14. The cargo handling system of claim 13, further comprising a plurality of the latch assembly.

15. A cargo handling system, comprising:
a control system comprising a main controller and a receiver;
a plurality of latch assemblies configured to be disposed throughout a cargo deck, each latch assembly in the plurality of latch assemblies comprising a latch state detection system, the latch state detection system including a transmitter, the transmitter configured to transmit a unique identifier to the receiver of the control system in response to a respective latch reaching a fully restrained state wherein:
each of the plurality of latch assemblies comprises a transducer configured to convert mechanical energy to electrical energy, and
in response to receiving the electrical energy, the transmitter is powered and configured to transmit a signal to a control unit.

16. The cargo handling system of claim 15, wherein the main controller is configured to send an indication that the respective latch assembly is in the fully restrained state in response to receiving the unique identifier from the receiver.

17. The cargo handling system of claim 15, wherein the transducer is configured to power the transmitter.

18. The cargo handling system of claim 15, wherein the transducer comprises a piezoelectric button.

19. The cargo handling system of claim 15, wherein the transducer comprises an electric generator configured to convert linear or rotational motion to the electrical energy.

* * * * *